(12) United States Patent
Hu et al.

(10) Patent No.: US 12,483,597 B2
(45) Date of Patent: Nov. 25, 2025

(54) HYBRID-TYPE AUTHORIZATION POLICY EVALUATION (71) Applicant: SAP SE, Walldorf (DE)

(72) Inventors: Kun Hu, Shanghai (CN); Na Zhang, Shanghai (CN); Yijin Hu, Shanghai (CN); Wenle Zhao, Shanghai (CN); You Li, Shanghai (CN); Fang Huang, Shanghai (CN); Weijun Yu, Shanghai (CN)

(73) Assignee: SAP SE, Walldorf (DE)

( * ) Notice: Subject to any disclaimer, the term of this patent is extended or adjusted under 35 U.S.C. 154(b) by 218 days.

(21) Appl. No.: 18/226,887

(22) Filed: Jul. 27, 2023

(65) Prior Publication Data

US 2025/0039238 A1    Jan. 30, 2025

(51) Int. Cl.
*H04L 9/40*    (2022.01)

(52) U.S. Cl.
CPC ............ *H04L 63/20* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 7,386,541 B2 | 6/2008 | Pal et al. | |
| 7,392,239 B2 | 6/2008 | Fontoura et al. | |
| 8,903,815 B2 | 12/2014 | Ellis et al. | |
| 9,372,846 B1* | 6/2016 | Perkov | G06F 40/211 |
| 10,002,254 B2 | 6/2018 | Anand et al. | |
| 10,025,936 B2 | 7/2018 | Anand et al. | |
| 10,162,613 B1* | 12/2018 | Vilozny | G06F 8/427 |
| 2001/0046282 A1* | 11/2001 | Bailey, III | H04M 3/4938 379/93.25 |
| 2006/0212859 A1 | 9/2006 | Parker et al. | |
| 2008/0215559 A1 | 9/2008 | Fontoura et al. | |
| 2010/0153933 A1* | 6/2010 | Bohlmann | G06F 8/73 717/144 |

\* cited by examiner

*Primary Examiner* — Ario Etienne
*Assistant Examiner* — Mohammad Yousuf A. Mian
(74) *Attorney, Agent, or Firm* — Sterne, Kessler, Goldstein & Fox P.L.L.C.

(57) ABSTRACT

Disclosed herein are system, method, and computer program product embodiments for hybrid-type authorization. An embodiment operates by parsing a policy expression into an abstract syntax tree (AST) and receiving, from a local server, user attribute data of a user. The embodiment further operates by traversing the AST to evaluate the user attribute data and determining whether a result of the traversing is indeterminate. In addition the embodiment operates by sending, to a remote server, a request for additional user attribute data in response to determining that the result is indeterminate, and receiving, from the remote server, the additional user attribute data. Then the embodiment operates by re-traversing the AST to evaluate the user attribute data and the additional user attribute data, authorizing the user based on at least one of the traversing or re-traversing, and outputting an authorization result.

20 Claims, 5 Drawing Sheets

| User ID | #context.country | #user.location | #context.region | #user.country | Missing data | result |
|---|---|---|---|---|---|---|
| #1 | unknown | unknown | APJ | unknown | #context.country #user.location #user.country | true |
| #2 | unknown | unknown | unknown | ZH | #user.location #user.country | true |
| #3 | unknown | unknown | EU | unknown | #context.country #user.location #user.country | indeterminate |
| #4 | DE | FRA | APJ | ZH | | true |
| #5 | FRA | APJ | EU | FRA | | false |

HYBRID-TYPE AUTHORIZATION POLICY EVALUATION

BACKGROUND

Microservices architecture is an important enterprise application architecture in today's cloud world. The basic pattern of the microservices architecture is decomposing an application by business capability or subdomain and having a database for each microservices.

When an application service using microservices architecture needs to perform authorization, there are two main possible methods. One method is for this application service to replicate all necessary authorization data in its own database and evaluate it on the application service side. The other method is that if some data is not present in its own database, it is evaluated by a remote authorization service. The disadvantage of the first method is that the data required by the application service becomes very large and the processing speed of the application service is reduced. The disadvantage of the second method is that the policy evaluation request must be sent to the remote authorization service, which slows down the response of a remote application programming interface (API) call, and the potential impact is a larger response data set.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for modeling and/or validating a process.

Figure 1:
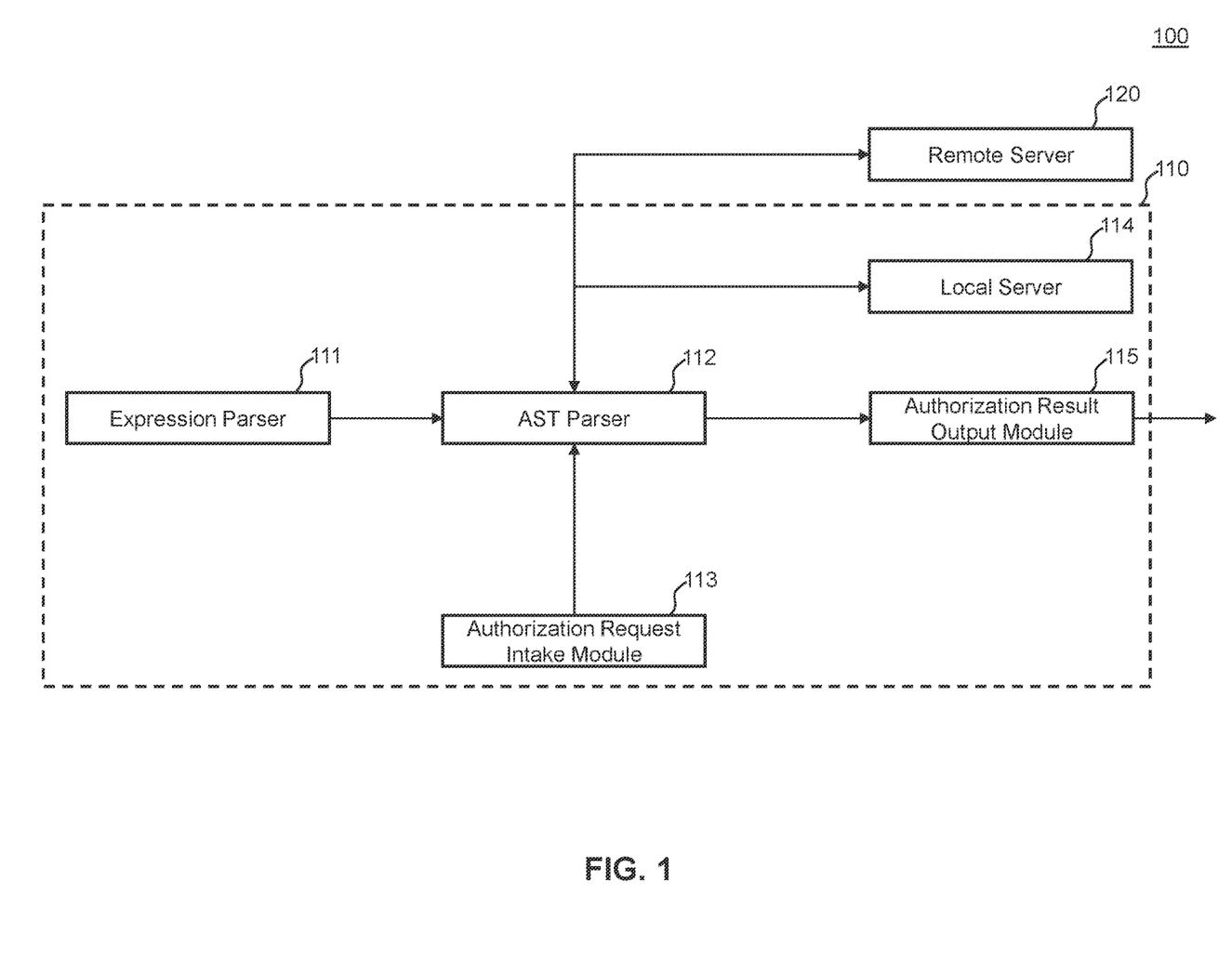
FIG. 1 is a block diagram of an authorization system, according to some embodiments.

FIG. 1 is a block diagram of an authorization system 100, according to some embodiments. The authorization system 100 may include a local system 110 and a remote server 120. The local system 110 may be designed as a part of a microservices architecture for user authorization. In other words, the local system 110 may be a system for providing authorization services, as one of microservices intended to provide one or more services. For example, one or more services aimed at providing business data to clients can be built as a set of the microservices such as the authorization system, a marketing system, an inventory management system, a sales management system, or the like. The remote server 120 may provide necessary data to the local system 110 as needed and may assist in the authentication of the local system 110.

The local system 110 may include an expression parser 111, an abstract syntax tree (AST) parser 112, an authorization request intake module 113, a local server 114, and an authorization result output module 115.

The expression parser 111 may receive and/or generate a policy expression. The policy expression may express a policy for the authorization (e.g., the user authorization). The policy expressions can be written according to predefined rules that can be handled by each element of the authorization system 100. The predefined rules can include predefined national rules. In a non-limiting example, the policy expression can be written as follows: (#context.region eq "APJ' or #user.country in ("ZH', "JP')) or ((#context.country eq "DE' or #user.location in ("FRA', "BER')). The aforementioned policy expression means that if 1) the user's context region is Asia Pacific Japan region or 2) the user's country is in China or Japan, or 3) the user's context country is Germany or 4) the user's location is in France or Bermuda, the authorization system 100 outputs permission as the authorization result. The expression parser may transmit the policy expression to the AST parser 112 to perform the authorization. The above policy expression is provided as an example and the embodiments of this disclosure are not limited to this policy expression.

The AST parser 112 may receive the policy expression from the expression parser 111. The AST parser 112 may parse the policy expression into the AST. The AST is an abstraction of a given syntax into a tree structure.

Figure 2:
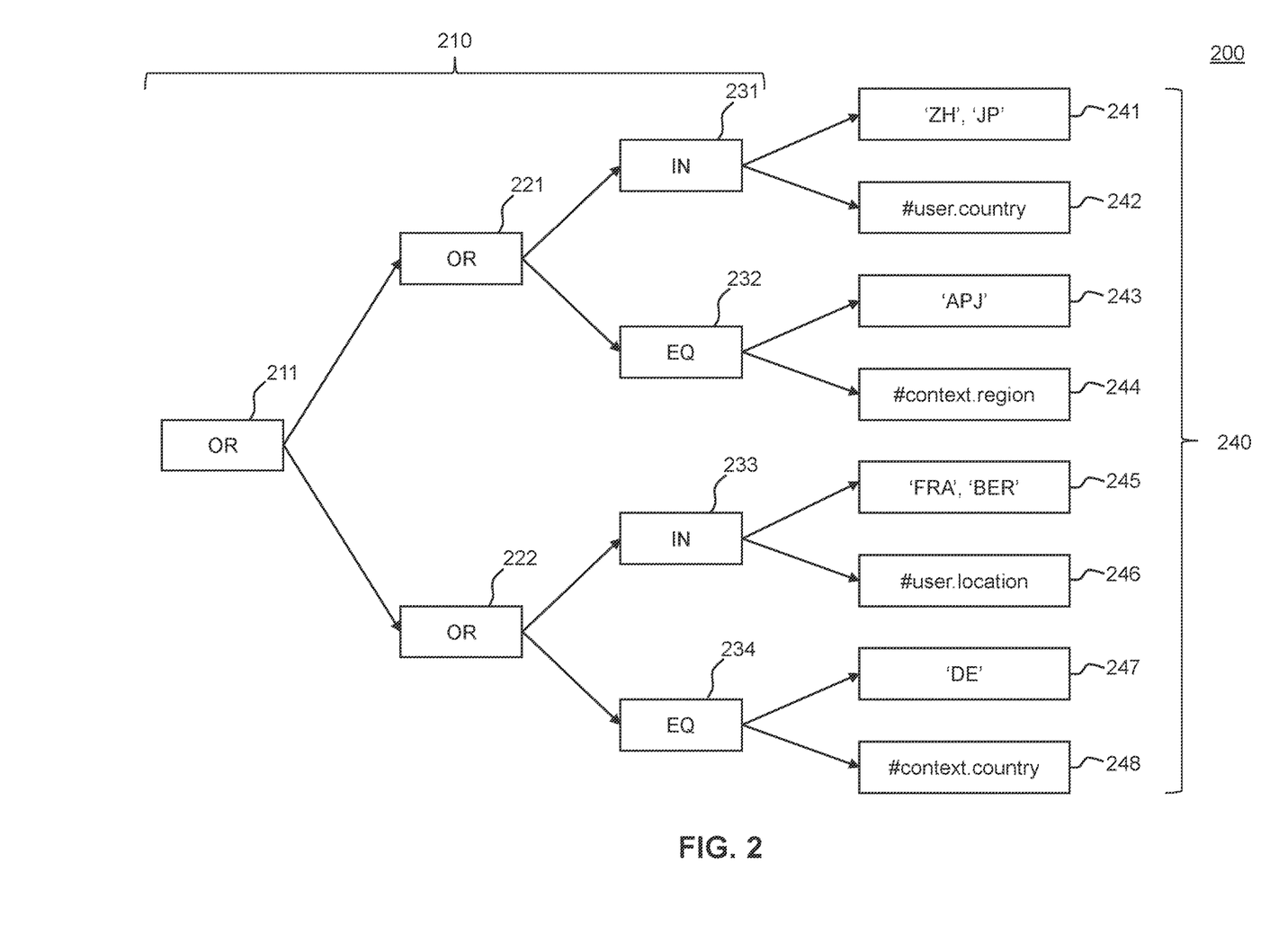
FIG. 2 is an example of an abstract syntax tree (AST) generated by policy expression parsing, according to some embodiments.

FIG. 2 is an example of the AST 200 generated by policy expression parsing, according to some embodiments. The AST parser 112 may parse the aforementioned policy expression into the AST 200. The AST 200 includes tree nodes 210 and leaf nodes 240 (also referred to collectively as nodes). The tree nodes 210 have two child nodes. The nodes other than a root node 211 has a parent node. For example, a tree node 231 has two child nodes of a leaf node 241 and a leaf node 242 and has a parent node of a tree node 221.

The tree nodes 210 are labeled by binary operators (e.g., "OR", "IN", or "EQ"). "OR" is the binary operator that returns true if one of the variables (e.g., values of the child nodes) is true. "IN" is a binary operator that returns true if at least one variable is within the range of the other. "EQ" is a binary operator that returns "true" when two variables exactly match. The leaf nodes 240 are labeled by expressions. Each node is based on a binary format. In other words, based on binary operators or expressions a value of the each node may be determined as "true" or "false." In this disclosure, the value of the each node may be "fail", which represents that the value is indeterminate. The authorization system 100 may determine the authorization result based on the value of the root node 211. For example, if at least one of the tree node 221 or a tree node 222 is "true", the value of the root node 211 is "true." In another example, if both of the tree node 221 or a tree node 222 is "indeterminate", the value of the root node 211 is "indeterminate." One of the reasons why the value is indeterminate is that there is a missing data to determine the value. The AST 200 is provided as an exemplary AST and the embodiments of this disclosure can include other structures of the AST.

Referring back to FIG. 1, the authorization request intake module 113 may receive an authorization request from outside of the authorization system 100. The authorization request may be requested by a user of the authorization system 100 or other microservices. The authorization request may contain a user ID of the user who is to be authorized.

The AST parser 112 may receive the authorization request from the authorization request intake module 113. The AST parser 112 may perform the authorization (e.g., authorizing the user corresponding to the user ID) based on the AST 200 and the received user ID. The AST parser 112 may receive, from a local server 114, user attribute data of the user corresponding to the user ID to perform the authorization. The user attribute data may be a data necessary for the authorization. For example, the user attribute data may contain the user's context region, the user's country, the user's context country, the user's location, and the like. Based on the received user attribute data and the AST 200, the AST parser 112 may perform the authorization. In this disclosure, authorization using AST 200 is also referred to as traversing the AST 200 for evaluating the user attribute data.

The AST parser 112 may send, to the remote server 120, a request for additional user attribute data to perform the authorization in response to determining that the authorization result is indeterminate. The remote server 120 may send, to the AST parser 112, the additional user attribute data in response to the request. After receiving the additional user attribute data, the AST parser 112 may re-traverse the AST 200 to evaluate the user attribute data and the additional user attribute data.

The authorization result output module 115 may output the authorization result to the outside of the authorization system 100. In principle, the authorization result may be determined based on the user attribute data stored in the local server 114. If the authorization result is indeterminate based on the user attribute data stored in the local server 114, the authorization result may be determined by referring to the user attribute data stored in the remote server 120. As such, for example, the authorization can be performed even if the local server 114 does not have the necessary data to make the results definitive. The detailed process of the authorization is further described below.

Figure 3:
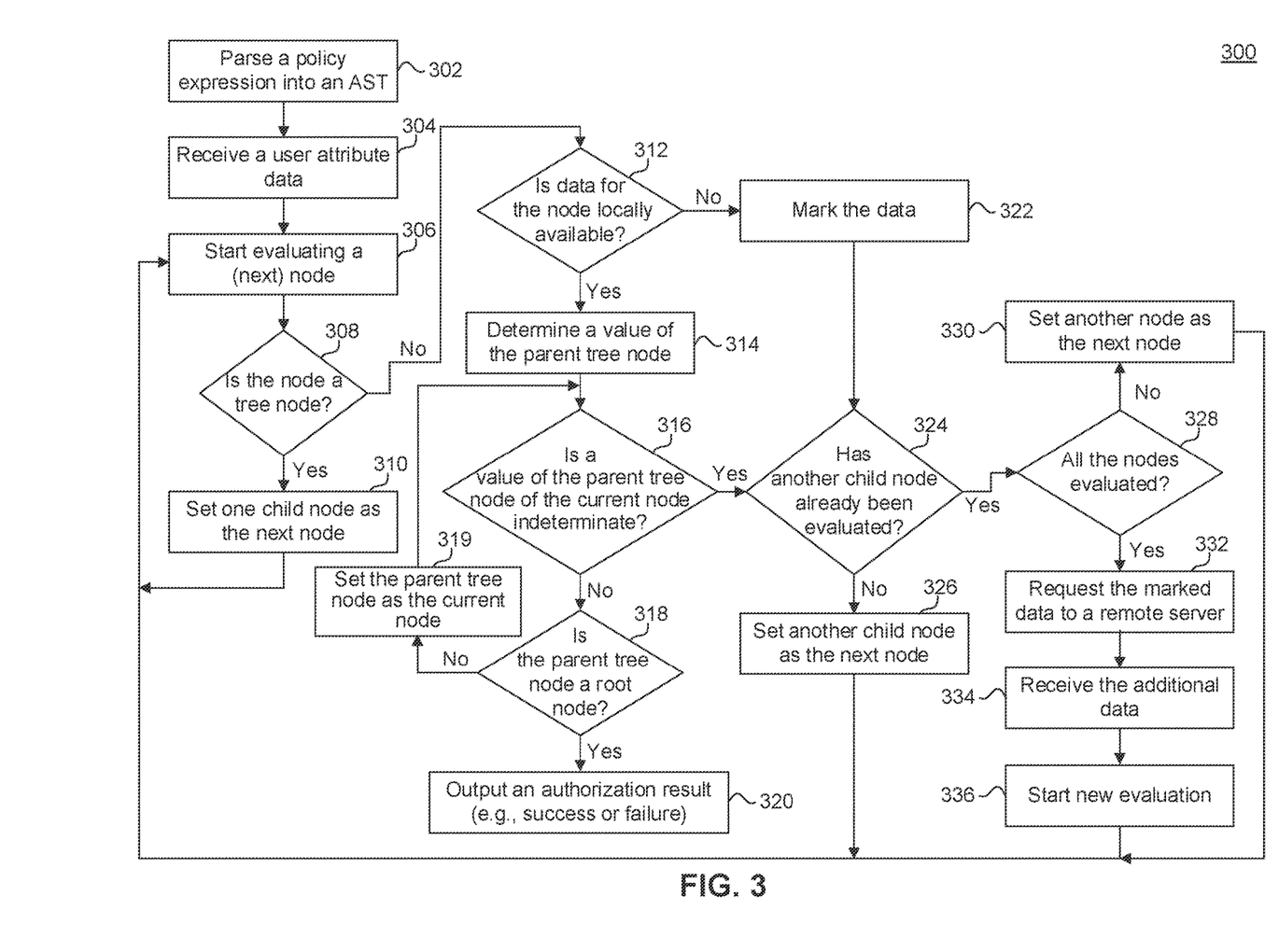
FIG. 3 is a flowchart for a method for an authorization, according to some embodiments.

FIG. 3 is a flowchart for a method 300 for an authorization, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. The method 300 shall be described with reference to FIGS. 1 and 2. However, method 300 is not limited to that example embodiment.

In 302, a policy expression may be parsed into the AST. For example, the AST parser 112 may parse the policy expression into the AST 200. The AST parser 112 may receive the policy expression from, for example, the expression parser 111 and may parse the policy expression into the AST.

In 304, user attribute data may be received. For example, the AST parser 112 may receive the user attribute data by fetching the user attribute from the local server 114. The user attribute data may correspond to the user ID that is identified in the authorization request intake by the authorization request intake module 113. For example, the AST parser 112 may receive the authorization request from the authorization request intake module 113. The AST parser 112 may determine the user ID from the authorization request. The AST parser 112 may send a request to the local server 114 for the user attribute data associated with the user ID.

In 306, an evaluation of the node starts. For example, the AST parser 112 may start traversing the AST 200 to evaluate the user attribute data. The first node to be evaluated may be the root node 212. The method of identifying nodes to be evaluated after the second round is described below. The node being evaluated is also called the current node.

In 308, it may be determined whether the node is a tree node. For example, the AST parser 112 determines whether the current node is one of the tree node 210 or not.

In 310, if the node is a tree node, one child node of the current node may be set as the next node. The one child node may be a child node uniquely identified for the current node. For example, the AST parser 112 may always set a lower child node (e.g., a child node shown below the other child node in FIG. 2,) as the next node. Thus, if the current node is the root node 211, the AST parser 112 may set the tree node 222 as the next node. In an alternative implementation, if the tree is oriented up and down, as opposed to the left-to-right orientation of FIG. 2, the next tree node could be the left child node (e.g., tree node 222) to be evaluated. When all of the nodes associated with 222 are evaluated, the next node to be evaluated would be node 221. This type of traversal is sometimes called left-right-node (LRN). It should be noted that other ways to traverse the tree are possible such as a right-left-node (RLN) traversal. Through 306 to 310, the series of operations is repeated until the current node becomes one of the leaf nodes 240 and the process moves to 312.

In 312, it may be determined whether the user attribute data for the current node is locally available. For example, the AST parser 112 evaluating a leaf node 247 may determine that the user attribute data for the current data is not locally available if the user attribute data provided by the local server 114 does not include the user's context country data.

In 314, if the user attribute data for the current node is locally available, a value of the parent tree node of the current node may be determined. For example, the AST parser 112 evaluating a leaf node 247 may determine that the value of the tree node 234 is "true" if the user attribute data provided by the local server 114 shows the user's context country is Germany.

The value of the parent node may be determined without considering all the child nodes. For example, if the AST parser 112 evaluating a tree node 232 find that the value of the tree node 232 is "true", then the value of the tree node 221 is definitively determined as "true" because the binary operator of the tree node 221 is "OR" so the value of the tree node 221 is always "true" regardless of the value of tree node 231. Thus, the AST parser 112 may finalize the value of the tree node 221 and may treat all subordinate nodes of the tree node 221 (e.g., the tree nodes 231 and 232, the leaf nodes 241, 242, 243, and 244) as evaluated. By "bypassing" some nodes in this way, the amount of computation required for authorization can be reduced and computation can be accelerated.

In 316, it may be determined whether the value of the parent tree node is indeterminate. For example, the AST parser 112 evaluating the tree node 232 may determine the value of the tree node is indeterminate if the user attribute data of the user shows the context region of the user is not Asia Pacific Japan region and the value of the tree node 231 has not been determined yet.

In 318, if the value of the parent tree node is not indeterminate, it may be determined whether the parent tree node is the root node.

In 319, if the parent node is not the root node, the parent tree node is set as the current node. Then the process returns to 316, and it continues to determine if the value of a further parent node of the parent node is indeterminate at this time, and loops through this process.

In 320, if the value of the root node is not indeterminate and confirmed, an authorization result (e.g., success or failure) may be output. For example, the authorization result output module 115 may output the authorization result based on the value of the root node 212 (true or false). The authorization result output module 115 may output the authorization result to the user who submitted the authorization request or other microservices.

In 322, if the user attribute data for the current node is not locally available, the user attribute data may be marked as unavailable and recorded. For example, AST parser 112 may mark and record the unavailable user attribute data.

In 324, after marking the unavailable data or it is determined that the value of the parent tree node of the current node is indeterminate in 316, it may be determined whether another child node of the parent tree node has already been evaluated For example, the AST parser 112 may determine whether another child node of the parent tree node has already been evaluated.

In 326, if another child node of the parent tree node has not already been evaluated, another child node may be set as the next node and the process may return to 306. For example, if the AST parser 112 evaluating a tree node 232 determine the value of the tree node is indeterminate since the user attribute data of the user shows the context region of the user is not Asia Pacific Japan region and the value of the tree node 231 has not been determined yet, the AST parser 112 may start evaluating the tree node 231.

In 328, if another child node of the parent tree node has already been evaluated, it may be determined whether all the nodes have been evaluated. In 330, if all the nodes have not been evaluated yet, another node may be set as the next node and the process returns to 306. This can be done by reverting to the parent node of the last node evaluated. As an example, after the evaluation of node 234 is completed, the process returns to node 222 in FIG. 2.

In 332, if all the nodes have been evaluated, the marked unavailable data may be requested to a remote server so as to obtain additional user attribute data. For example, the AST parser 112 requests from the remote server 120, the unavailable data marked in 322 as the additional user attribute data.

In 334, the requested additional user attribute data may be received. For example, the AST parser 112 may receive the additional user attribute data from the remote server 120.

In 336, a new evaluation is started. In other words, re-traversing of the AST to evaluate the user attribute data and the additional user attribute data is started. In this way, even if authorization could not be determined due to the fact that data did not exist on the local server 114, additional data obtained from the remote server 120 can be used to perform authorization.

Figure 4:
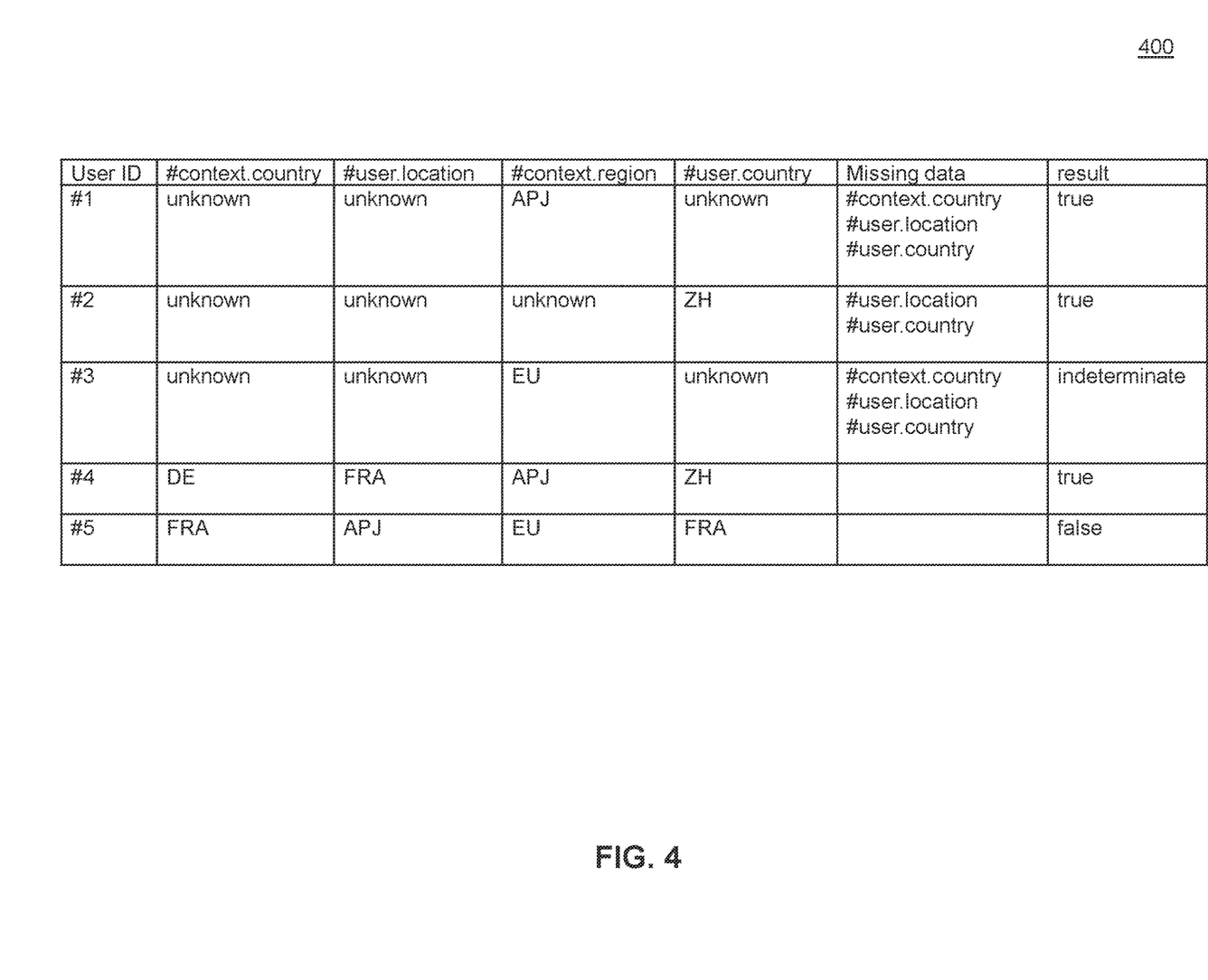
FIG. 4 is an example of a table showing authentication results, according to some embodiments.

FIG. 4 is an example of a table 400 showing authentication results, according to some embodiments. According to the process described above, the AST parser 112 may receive and evaluate additional data from the remote server 120 when there is unavailable data (e.g., missing data) and the authorization result is indeterminate due to the unavailable data. In other words, the AST parser 112 can detect the missing data in the user attribute data necessary to make the result definitive. For instance, FIG. 4 shows the evaluation results of the five user IDs that the authorization request intake module 113 intakes before the AST parser 112 sends a request to the remote server 120. As shown in FIG. 4, all the user attribute data of users of user IDs #4 and #5 are available at the local server 114, and the authorization results of the users are definitive. Some of the user attribute data of users of user IDs #1 and #2 are unavailable because of the missing data at the local server 114, but authorization results of the users are still definitive so that the AST parser 112 may not send the request to the remote server 120.

In contrast, regarding the user ID #3, the context country, the user location, and the user country of the user is missing and thus the result is indeterminate. This is because, in such a situation, the values of the tree node 222, 233, and 234 are indeterminate because of the missing data. And since requests are sent to the remote server 120 in such cases to receive additional data, not only can the amount of communication between the local system 110 and the remote server 120 be reduced, but the speed of authorization is also increased since it is no longer necessary to store all necessary data on the local server 114 and in some cases authorization can be completed only on the local system 110. This hybrid-type authorization, which is a collaboration of the local server 114 and the remote server 120, addresses the tradeoff between increased memory consumption from relying solely on local data and decreased computation speed from relying on data from remote servers. Thus, this disclosure relates to the improvement of computer functions required for authorization. Storing all the data necessary for authorization locally increases memory usage and search time for fetching data, resulting in an increase in processing time for authorization. If all of the data required for authorization is stored remotely, the time required for communication and uptime on the remote side will also increase the processing time required for authorization. According to this disclosure, instead of simply retrieving missing data from the remote server 120, data that is truly necessary for authorization is identified and then retrieved from the remote server 120, allowing the advantages of both the local and remote systems to be used to supplement the aforementioned disadvantages, resulting in reduced processing time, computation, and memory consumption required for authorization.

Figure 5:
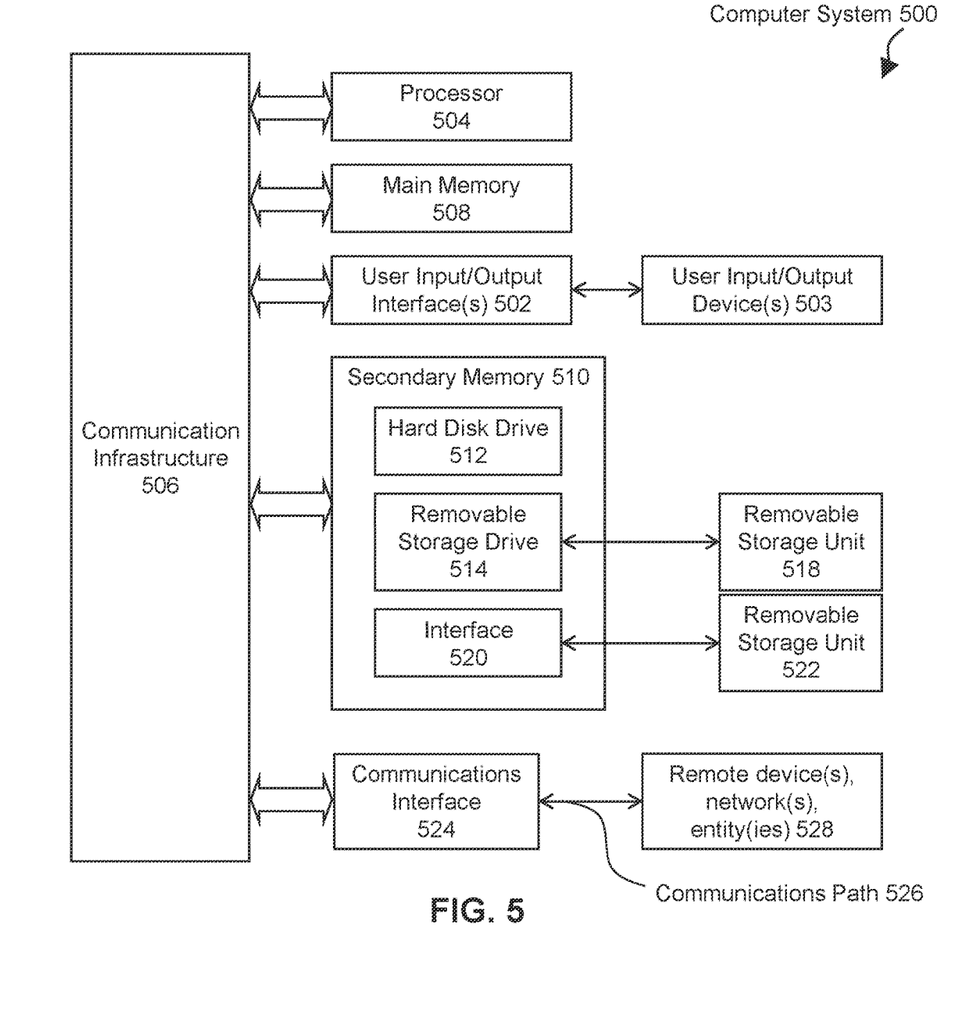
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents

What is claimed is:

1. A computer-implemented method for authorization, comprising:
    parsing, by at least one processor, a policy expression into an abstract syntax tree (AST);
    receiving, from a local server, user attribute data of a user;
    traversing the AST to evaluate the user attribute data;
    determining whether a result of the traversing is indeterminate;
    sending, to a remote server, a request for additional user attribute data in response to determining that the result of the traversing is indeterminate;
    receiving, from the remote server, the additional user attribute data;
    re-traversing the AST to evaluate the user attribute data and the additional user attribute data;
    authorizing the user based on at least one of the traversing or re-traversing; and
    outputting an authorization result.

2. The computer-implemented method of claim 1, wherein the determining comprises:
    detecting missing data in the user attribute data for making the result of the traversing definitive.

3. The computer-implemented method of claim 2, wherein the additional user attribute data corresponds to the missing data of the user attribute data.

4. The computer-implemented method of claim 1, wherein at least one of the traversing or the re-traversing comprises:
    determining a value of a tree node having two child nodes based on considering one of the two child nodes;
    determining whether the value of the tree node is definitive without considering an other one of the two child nodes; and
    finalizing the value of the tree node after determining that the value of the tree node is definitive without considering the other one of the two child nodes.

5. The computer-implemented method of claim 1, wherein at least one of the user attribute data or the additional user attribute data comprises country information.

6. The computer-implemented method of claim 1, wherein at least one of the user attribute data or the additional user attribute data comprises location information.

7. The computer-implemented method of claim 1, wherein at least one of the user attribute data or the additional user attribute data comprises region information.

8. A system for authorization, comprising:
    a memory; and
    at least one processor coupled to the memory and configured to:
        parse a policy expression into an abstract syntax tree (AST);
        receive, from a local server, user attribute data of a user;
        traverse the AST to evaluate the user attribute data;
        determine whether a result of the traversing is indeterminate;
        send, to a remote server, a request for additional user attribute data in response to determining that the result of the traversing is indeterminate;
        receive, from the remote server, the additional user attribute data;
        re-traverse the AST to evaluate the user attribute data and the additional user attribute data;
        authorize the user based on at least one of the traversing or re-traversing; and
        output an authorization result.

9. The system of claim 8, wherein to determine whether the result of the traversing is indeterminate, the at least one processor is further configured to:
    detect missing data in the user attribute data for making the result of the traversing definitive.

10. The system of claim 9, wherein the additional user attribute data corresponds to the missing data of the user attribute data.

11. The system of claim 8, wherein to at least traverse the AST to evaluate the user attribute data or to re-traverse the AST to evaluate the user attribute data and the additional user attribute data, the at least one processor is further configured to:
    determine a value of a tree node having two child nodes based on considering one of the two child nodes;
    determine whether the value of the tree node is definitive without considering an other one of the two child nodes; and
    finalize the value of the tree node after determining that the value of the tree node is definitive without considering the other one of the two child nodes.

12. The system of claim 8, wherein at least one of the user attribute data or the additional user attribute data comprises country information.

13. The system of claim 8, wherein at least one of the user attribute data or the additional user attribute data comprises location information.

14. The system of claim 8, wherein at least one of the user attribute data or the additional user attribute data comprises region information.

15. A non-transitory computer-readable medium having instructions stored thereon that, when executed by at least one computing device, cause the at least one computing device to perform operations comprising:
    parsing a policy expression into an abstract syntax tree (AST);
    receiving, from a local server, user attribute data of a user;
    traversing the AST to evaluate the user attribute data;
    determining whether a result of the traversing is indeterminate;
    sending, to a remote server, a request for additional user attribute data in response to determining that the result of the traversing is indeterminate;
    receiving, from the remote server, the additional user attribute data;
    re-traversing the AST to evaluate the user attribute data and the additional user attribute data;
    authorizing the user based on at least one of the traversing or re-traversing; and
    outputting an authorization result.

16. The non-transitory computer-readable medium of claim 15, wherein the determining comprises:
   detecting missing data in the user attribute data for making the result of the traversing definitive.

17. The non-transitory computer-readable medium of claim 16, wherein the additional user attribute data corresponds to the missing data of the user attribute data.

18. The non-transitory computer-readable medium of claim 15, wherein at least one of the traversing or the re-traversing comprises:
   determining a value of a tree node having two child nodes based on considering one of the two child nodes;
   determining whether the value of the tree node is definitive without considering an other one of the two child nodes; and
   finalizing the value of the tree node after determining that the value of the tree node is definitive without considering the other one of the two child nodes.

19. The non-transitory computer-readable medium of claim 15, wherein at least one of the user attribute data or the additional user attribute data comprises country information.

20. The non-transitory computer-readable medium of claim 15, wherein at least one of the user attribute data or the additional user attribute data comprises location information.

* * * * *